(12) United States Patent
Kim

(10) Patent No.: US 10,005,516 B2
(45) Date of Patent: Jun. 26, 2018

(54) BICYCLE DRIVING DEVICE

(71) Applicant: Junghun Kim, Suwon-si (KR)

(72) Inventor: Junghun Kim, Suwon-si (KR)

( * ) Notice: Subject to any disclaimer, the term of this patent is extended or adjusted under 35 U.S.C. 154(b) by 209 days.

(21) Appl. No.: 15/104,429

(22) PCT Filed: Dec. 31, 2014

(86) PCT No.: PCT/KR2014/013120
§ 371 (c)(1),
(2) Date: Jun. 14, 2016

(87) PCT Pub. No.: WO2015/105297
PCT Pub. Date: Jul. 16, 2015

(65) Prior Publication Data
US 2016/0332694 A1    Nov. 17, 2016

(30) Foreign Application Priority Data

Jan. 13, 2014  (KR) .................. 10-2014-0003936

(51) Int. Cl.
*B62M 3/06* (2006.01)
*B62M 1/36* (2013.01)
*B62M 3/02* (2006.01)

(52) U.S. Cl.
CPC ............... *B62M 3/06* (2013.01); *B62M 1/36* (2013.01); *B62M 3/02* (2013.01)

(58) Field of Classification Search
CPC ............ B62M 3/06; B62M 3/02; B62M 1/36
See application file for complete search history.

(56) References Cited

U.S. PATENT DOCUMENTS 2,723,132 A * 11/1955 Oberwegner ............... B62J 1/14
                                                          280/231
9,555,853 B2 * 1/2017 Sprague ................... B62M 1/26
(Continued)

FOREIGN PATENT DOCUMENTS

DE         3121010 A1 * 12/1982
FR         2388713       * 11/1978
(Continued)

*Primary Examiner* — Vinh Luong
(74) *Attorney, Agent, or Firm* — Novick, Kim & Lee, PLLC; Sang Ho Lee

(57) ABSTRACT

A bicycle driving device: a first socket coupled to a frame; a first crankshaft rotatably coupled to the inside of the first socket; a first left crank arm coupled to the left side of the first crankshaft; a first right crank arm coupled to the right side of the first crankshaft; a second socket coupled to the frame at a location spaced from the first socket; a second crankshaft rotatably coupled to the inside of the second socket; a second left crank arm coupled to the left side of the second crankshaft; a second right crank arm coupled to the right side of the second crankshaft; a left pedal arm pivotally coupled to an end portion of the first left crank arm and to an end portion of the second left crank arm, the left pedal arm having a left pedal coupling portion positioned on an end thereof to be closer to the front than the end portion of the first left crank arm; a left pedal rotatably coupled to the left pedal coupling portion; a right pedal arm pivotally coupled to an end portion of the first right crank arm and to an end portion of the second right crank arm, the tight pedal arm having a right pedal coupling portion positioned on an end thereof to be closer to the front than the end portion of the first right crank arm; and a right pedal rotatably coupled to the right pedal coupling portion.

5 Claims, 7 Drawing Sheets

(56) References Cited

U.S. PATENT DOCUMENTS

| | | | | |
|---|---|---|---|---|
| 2011/0146442 A1* | 6/2011 | Gobillard | ............ | B62M 1/36 |
| | | | | 74/560 |
| 2012/0013097 A1* | 1/2012 | Fan | ............ | B62K 3/002 |
| | | | | 280/221 |
| 2014/0265218 A1* | 9/2014 | Scolari | ............ | B62M 3/08 |
| | | | | 280/261 |
| 2017/0253294 A1* | 9/2017 | Ascher | ............ | B62K 3/002 |

FOREIGN PATENT DOCUMENTS

| | | | |
|---|---|---|---|
| FR | 2543098 | * | 9/1984 |
| JP | 11-263279 A | | 9/1999 |
| JP | 2009-119924 A | | 6/2009 |
| KR | 20-2009-0000283 U | | 1/2009 |
| KR | 10-2010-0043003 A | | 4/2010 |
| KR | 10-2013-0140460 A | | 12/2013 |

* cited by examiner

BICYCLE DRIVING DEVICE

TECHNICAL FIELD

The present disclosure relates to a bicycle driving device, and more particularly, to a bicycle driving device for effectively transmitting the energy of a rider and transmitting a power just with a small force by means of the principle of levers.

BACKGROUND ART

As shown in a side view of FIG. 1, an existing bicycle driving device 10 includes a socket 11 coupled to a frame, a crankshaft 12 rotatably coupled to the socket, a pair of crank arms 13a, 13b coupled to both sides of the crankshaft 12, and pedals 14a, 14b coupled to ends of the crank arms 13a, 13b. FIG. 2 is a plane view showing the existing bicycle driving device 10.

As shown in FIG. 3, the left pedal 14a rotates while along a circular orbit in a counterclockwise direction on the basis of the crankshaft 12. At this time, when the left pedal 14a is located at a front position (the region from A1 to A3), a rider may apply a force to the crankshaft 12 by the left foot. When the left pedal 14a is located at A2, a strongest force may be applied to the crankshaft 12 in consideration of the principle of levers. Meanwhile, when the left pedal 14a is located at a rear position (the region from A3 to A1), it is impossible to apply a force. When the left pedal 14a is located at a rear position, since the right pedal 14b is located at a front position, a force may be transmitted to the crankshaft 12 by the right foot.

The rotating force transmitted to the crankshaft 12 is greater as the length of the crank arms 13a, 13b is greater. However, in consideration of a body structure of human, the length of the crank arms 13a, 13b is substantially standardized.

Meanwhile, when the left pedal 14a is located at A1 of FIG. 3, if a rider applies a force in a gravity direction by the left foot, the force is entirely transmitted to push the crankshaft 12. If a force is applied to the left pedal 14a in the gravity direction at the position A1, the crankshaft 12 is not rotated.

Meanwhile, when the left pedal 14a rotates in a counterclockwise direction on the basis of A1, it is assumed that a force F perpendicular to the left pedal 14a is applied. At this time, the force of $F*\sin\theta$ with respect to a rotation angle $\theta$ on the basis of the location A1 is transmitted to the crankshaft 12 as a rotation energy. Moreover, since $F*\cos\theta$ applies a force in a horizontal direction of the crankshaft, the force disappears.

Korean utility model publication No. 20-2009-0000283 (entitled 'a device for varying a turning radius of a bicycle pedal') belongs to a field associated with the present disclosure.

DISCLOSURE

Technical Problem

The present disclosure is directed to providing a bicycle driving device which may transmit a strong force to a crankshaft by means of the principle of levers, by moving a rotation orbit of a pedal to the front so that the pedal is spaced from the crankshaft when being located at a front position.

In addition, the present disclosure is directed to providing a bicycle driving device which may reduce a force loss and transmit a force to rotate the crankshaft even though the pedal is at an upper top, by moving an orbit of the pedal to the front.

In addition, the present disclosure is directed to providing a bicycle driving device which may not give any inconvenience to a rider by designing the pedal to have the same orbit size as an existing one.

In addition, the present disclosure is directed to providing a bicycle driving device which may allow soft rotation by designing a first crankshaft and a second crankshaft to rotate 360 degrees simultaneously.

Technical Solution

In one aspect of the present disclosure, there is provided a bicycle driving device, comprising:
a first socket 211 coupled to a frame 201;
a first crankshaft 221 rotatably coupled to the inside of the first socket 211;
a first left crank arm 231 coupled to the left side of the first crankshaft 221;
a first right crank arm 232 coupled to the right side of the first crankshaft 221;
a second socket 212 coupled to the frame 201 at a location spaced from the first socket 211;
a second crankshaft 222 rotatably coupled to the inside of the second socket 212;
a second left crank arm 241 coupled to the left side of the second crankshaft 222;
a second right crank arm 242 coupled to the right side of the second crankshaft 222;
a left pedal arm 251 pivotally coupled to an end portion of the first left crank arm 231 and to an end portion of the second left crank arm 241, the left pedal arm 251 having a left pedal coupling portion 2511 positioned on an end thereof to be closer to the front than the end portion of the first left crank arm 231;
a left pedal 261 rotatably coupled to the left pedal coupling portion 2511;
a right pedal arm 252 pivotally coupled to an end portion of the first right crank arm 232 and to an end portion of the second right crank arm 242, the right pedal arm 252 having a right pedal coupling portion 2521 positioned on an end thereof to be closer to the front than the end portion of the first right crank arm 232; and
a right pedal 262 rotatably coupled to the right pedal coupling portion 2521.

In addition, the left pedal arm 251 and the second left crank arm 241 may be coupled to be floatable, and the right pedal arm 252 and the second right crank arm 242 may be coupled to be floatable.

In addition, a power transmission module for transmitting a power of the first crankshaft 221 to the second crankshaft 222 may be further coupled between the first crankshaft 221 and the second crankshaft 222.

In addition, the second crankshaft 222 may be located at an upper portion of the first crankshaft 221.

In addition, a driving sprocket 202 may be coupled to at least one of the first crankshaft 221 and the second crankshaft.

Advantageous Effects

The present disclosure provides a bicycle driving device which may transmit a strong force to a crankshaft by means of the principle of levers, by moving a rotation orbit of a pedal to the front so that the pedal is spaced from the crankshaft when being located at a front position.

In addition, the present disclosure provides a bicycle driving device which may reduce a force loss and transmit a force to rotate the crankshaft even though the pedal is at an upper top, by moving an orbit of the pedal to the front.

In addition, the present disclosure provides a bicycle driving device which may not give any inconvenience to a rider by designing the pedal to have the same orbit size as an existing one.

In addition, the present disclosure provides a bicycle driving device which may allow soft rotation by designing a first crankshaft and a second crankshaft to rotate 360 degrees simultaneously.

BEST MODE

Figure 1:
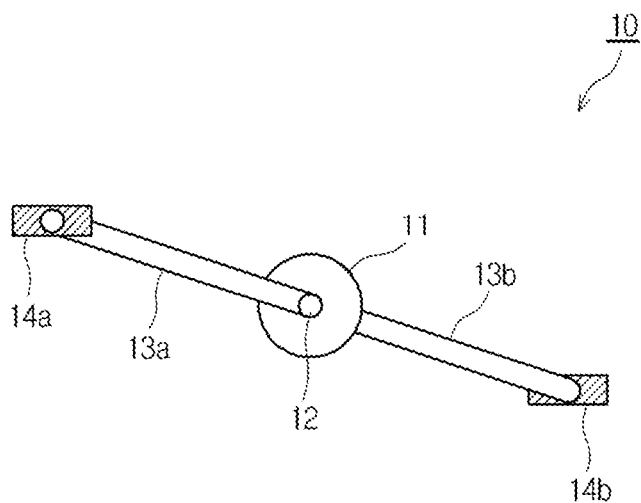
FIG. 1 is a side view showing an existing bicycle driving device.
Figure 2:
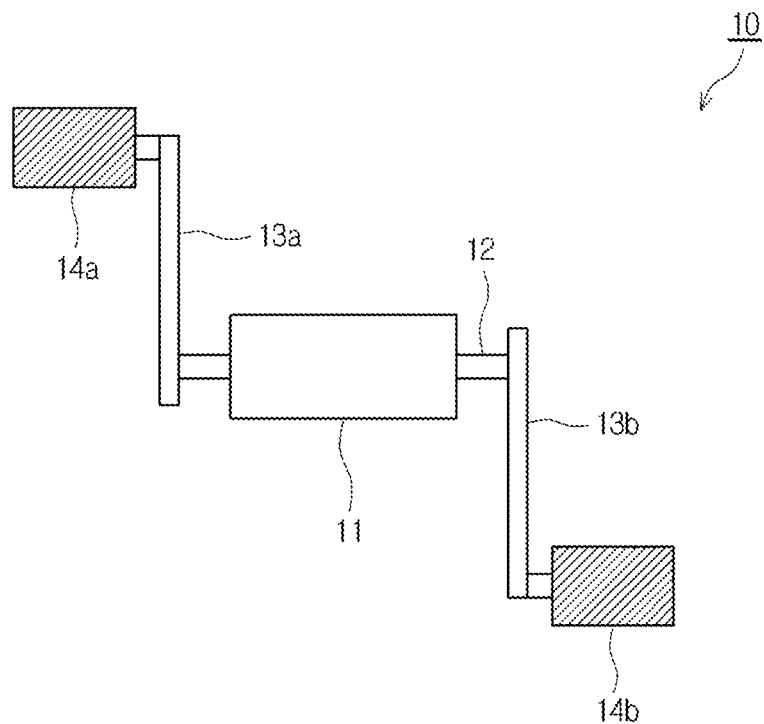
FIG. 2 is a plane view showing the existing bicycle driving device.

According to an embodiment of the present disclosure, there is provided a bicycle driving device, which includes:
a first socket 211 coupled to a frame 201;
a first crankshaft 221 rotatably coupled to the inside of the first socket 211;
a first left crank arm 231 coupled to the left side of the first crankshaft 221;
a first right crank arm 232 coupled to the right side of the first crankshaft 221;
a second socket 212 coupled to the frame 201 at a location spaced from the first socket 211;
a second crankshaft 222 rotatably coupled to the inside of the second socket 212;
a second left crank arm 241 coupled to the left side of the second crankshaft 222;
a second right crank arm 242 coupled to the right side of the second crankshaft 222;
a left pedal arm 251 pivotally coupled to an end portion of the first left crank arm 231 and to an end portion of the second left crank arm 241, the left pedal arm 251 having a left pedal coupling portion 2511 positioned on an end thereof to be closer to the front than the end portion of the first left crank arm 231;
a left pedal 261 rotatably coupled to the left pedal coupling portion 2511;
a right pedal arm 252 pivotally coupled to an end portion of the first right crank arm 232 and to an end portion of the second right crank arm 242, the right pedal arm 252 having a right pedal coupling portion 2521 positioned on an end thereof to be closer to the front than the end portion of the first right crank arm 232; and
a right pedal 262 rotatably coupled to the right pedal coupling portion 2521.

MODE FOR DISCLOSURE

Hereinafter, preferred embodiments of the present disclosure will be described in detail with reference to the accompanying drawings. These embodiments are just for illustrations for a person having ordinary skill in the art to easily implement the present disclosure, but this does not mean that the feature and scope of the present disclosure are limited to these embodiments.

In the following description, the term "left side" means that any component is located at a left side on the basis of a bicycle rider. In the following description, the term "front" means an advancing direction of a bicycle. The following description is based on a general standing-type bicycle. In case of a recumbent bicycle that is ridden in a reclining position, the angle of a driving device is changed as much as a reclining angle as a matter of course. A corresponding side opposite to the above may not be explained.

Figure 4:
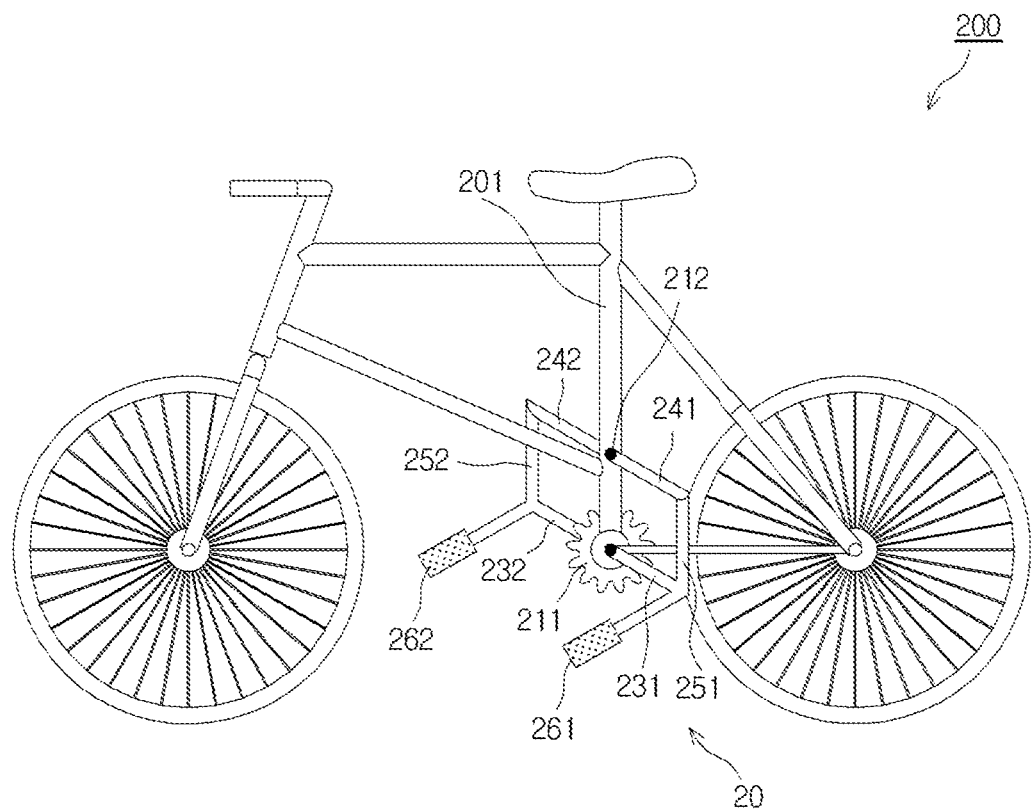
FIG. 4 is a side view showing a bicycle according to the first embodiment of the present disclosure.
Figure 5:
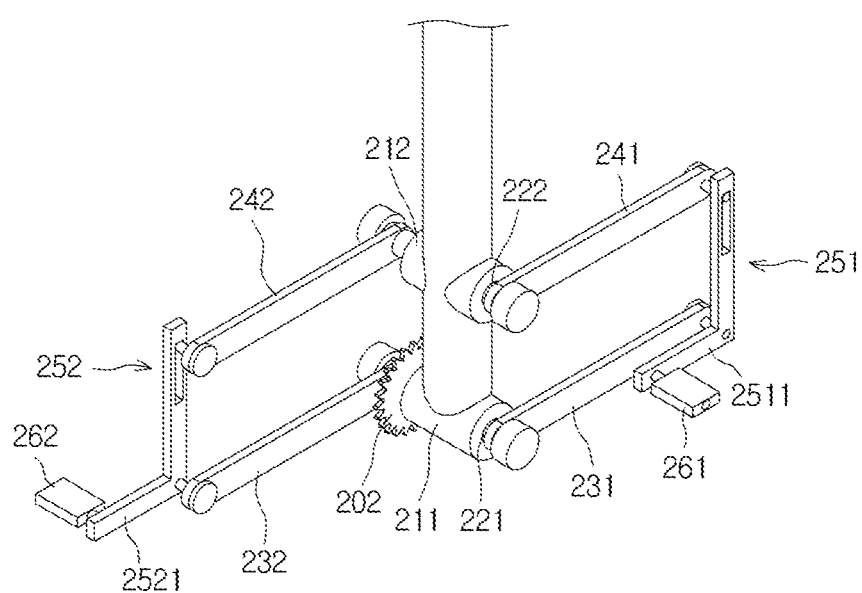
FIG. 5 is a perspective view showing a bicycle driving device according to the first embodiment of the present disclosure.
Figure 6:
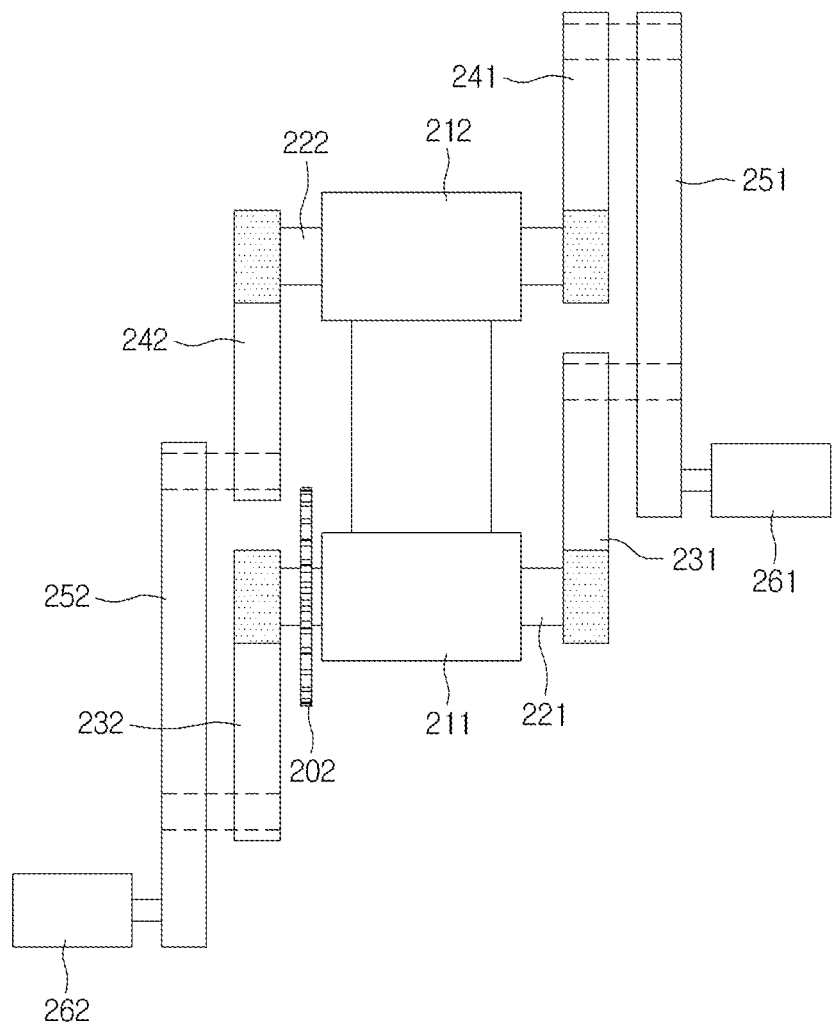
FIG. 6 is a plane view showing the bicycle driving device according to the first embodiment of the present disclosure.
Figure 7:
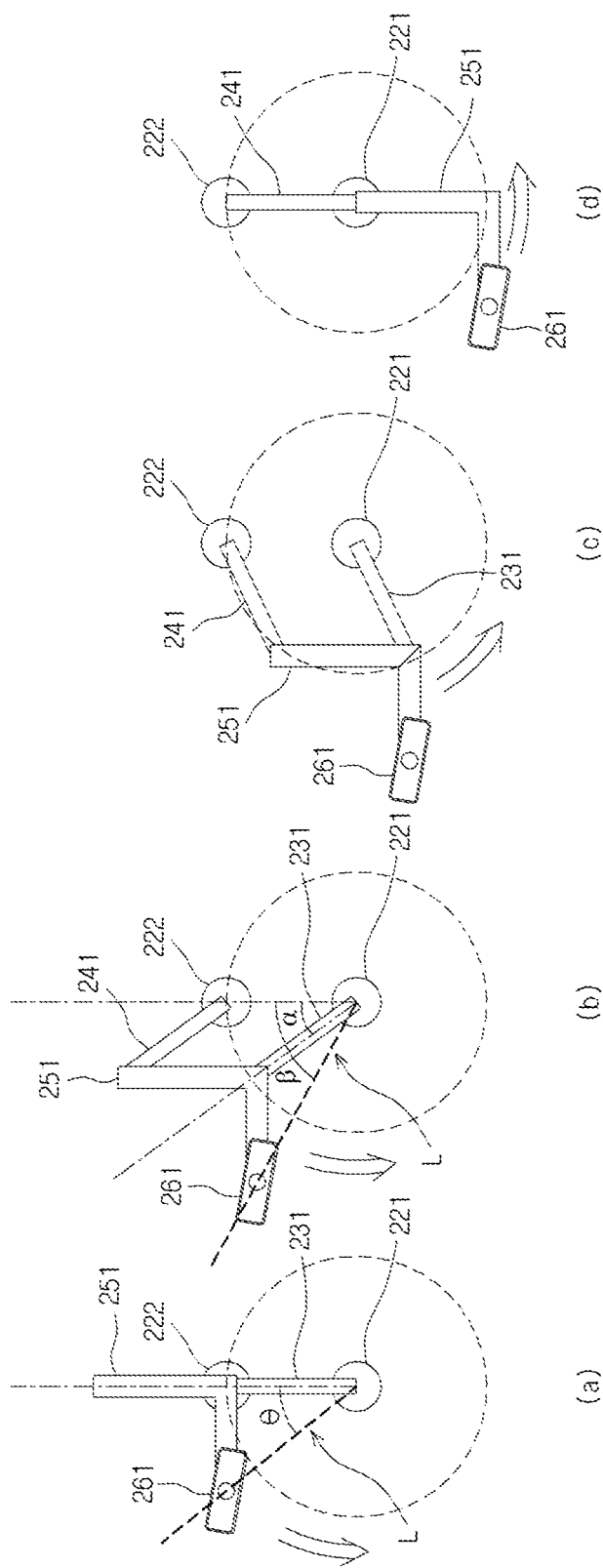
FIG. 7 is a diagram for illustrating an orbit of a left pedal of the bicycle driving device according to the first embodiment of the present disclosure.
Figure 8:
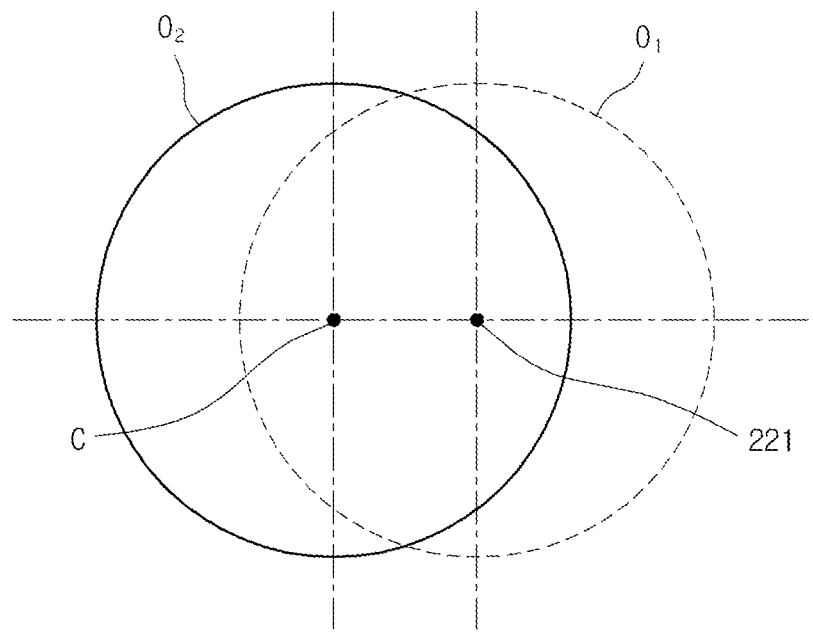
FIG. 8 is a diagram for illustrating a rotated position of the left pedal according to a rotation of an end portion of a first left crank arm in the bicycle driving device according to the first embodiment of the present disclosure.
Figure 9:
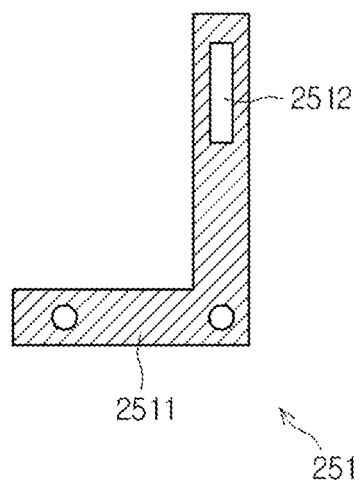
FIG. 9 is a plane view showing a left pedal arm in the bicycle driving device according to the first embodiment of the present disclosure.

FIG. 4 is a side view showing a bicycle according to the first embodiment of the present disclosure. FIG. 5 is a perspective view showing a bicycle driving device according to the first embodiment of the present disclosure. FIG. 6 is a plane view showing the bicycle driving device according to the first embodiment of the present disclosure. FIG. 7 is a diagram for illustrating an orbit of a left pedal of the bicycle driving device according to the first embodiment of the present disclosure. FIG. 8 is a diagram for illustrating a rotated position of the left pedal according to a rotation of an end portion of a first left crank arm in the bicycle driving device according to the first embodiment of the present disclosure. FIG. 9 is a plane view showing a left pedal arm in the bicycle driving device according to the first embodiment of the present disclosure.

As shown in FIG. 4, a bicycle 200 of the present disclosure has technical features in a bicycle driving device 20. Therefore, hereinafter, structures and functions of the bicycle driving device 20 will be described in detail.

A frame 201 plays a role of supporting the entire structure of the bicycle 200 and may be made of metal material or non-metal material. The shape of the frame 201 may be modified in various ways.

A first socket 211 is coupled to the frame 201. The first socket 211 has a hollow formed therethrough. A first crankshaft 221 is rotatably coupled to the inside of the first socket 211. A bearing may be coupled between the first crankshaft 221 and the first socket 211 to reduce a friction. Here, the socket means a component which is generally called a bottom bracket (BB). A driving sprocket 202 may be coupled to the first crankshaft 221. The driving sprocket 202 may transmit a power to a driven sprocket coupled to a rear wheel, by means of a chain, a belt or the like.

A first left crank arm 231 is coupled to the left side of the first crankshaft 221. The first crankshaft 221 and the first left crank arm 231 are fixedly coupled without pivoting. A first right crank arm 232 is coupled to the right side of the first crankshaft 221. The first crankshaft 221 and the first right crank arm 232 are fixedly coupled without pivoting. If the first left crank arm 231 is pivoted, the first crankshaft 221 rotates, and the first right crank arm 232 coupled to the first crankshaft 221 is also pivoted.

The second socket 212 is coupled at a location spaced from the first socket 211. The structure of the second socket 212 is similar to that of the first socket 211. A second crankshaft 222 is rotatably coupled to the inside of the second socket 212. A gap between the first socket 211 and the second socket 212 may be greater than a length of the crank arms 231, 232, 241, 242. This may prevent the crank arms 231, 232, 241, 242 from disturbing end portions thereof when rotating.

A second left crank arm 241 is fixedly coupled to the left side of the second crankshaft 222. A second right crank arm 242 is fixedly coupled to the right side of the second crankshaft 222. If the second crankshaft 222 rotates, the second left crank arm 241 and the second right crank arm 242 are pivoted at a diagonal position.

A left pedal arm 251 is pivotally coupled to the end portion of the first left crank arm 231 and the end portion of the second left crank arm 241. The left pedal arm 251 may have a left pedal coupling portion 2511 bent toward the front. The left pedal coupling portion 2511 may be horizontal to the ground. According to the arrangement of the first crankshaft 221 and the second crankshaft 222, a bending angle of the left pedal coupling portion 2511 may be determined at the left pedal arm 251.

The second crankshaft 222 is located at an upper portion of the first crankshaft 221. When the second crankshaft 222 is located at the upper portion of the first crankshaft 221, the crank arms 231, 232, 241, 242 may rotate smoothly.

A left pedal 261 is rotatably coupled to the left pedal coupling portion 2511.

If the left pedal 261 is stepped, the first left crank arm 231 and the second left crank arm 241 are pivoted, and the first crankshaft 221 and the second crankshaft 222 are pivoted at the same angular speed. In addition, the first right crank arm 232 and the second right crank arm 242 respectively coupled to the first crankshaft 221 and the second crankshaft 222 at an opposite side are also pivoted. As the crank arms 231, 232, 241, 242 are naturally pivoted 360 degrees as described above, a rider may step pedals with the same feeling as at an existing bicycle.

If the second left crank arm 241 and the second right crank arm 242 operating in a driven way reciprocate within a certain angle like a pendulum without rotating 360 degrees, an impact (jolt) occurs at a point where the arms change their direction. In the present disclosure, the second left crank arm 241 and the second right crank arm 242 rotates (makes a circular movement) softly, and thus there is no impact (jolt) due to the rotating motion.

Further, if the second crankshaft 222 is located at the upper portion of the first crankshaft 221 as in this embodiment, due to the force of the pedal arms 251, 252 pulling downwards, the second crank arms 241, 242 are also pulled downwards so that two crank arms 231, 232, 241, 242 are placed in a straight line. At this time, due to an advancing movement of a pedal at an opposite side, which is located at an upper position, a pedal arm located at a lower position naturally rotates. If the second crankshaft 222 is located in a horizontal direction of the first crankshaft 221, when the pedals 261, 262 are stepped downwards, connection portions of the pedal arms 251, 252 and the second crank arms 241, 242 are forced to move upwards, and thus there is created a region which disturbs that the second crankshaft 222 rotates in the same direction as the first crankshaft 221.

The first left crank arm 231, the second left crank arm 241, the left pedal arm 251 and the frame 201 are partially coupled to form a deformable diamond structure. If the first crankshaft 221 and the second crankshaft 222 rotate, the first left crank arm 231 and the second left crank arm 241 respectively connected thereto also rotate to deform the diamond shape.

Meanwhile, the right pedal arm 252 is pivotally coupled to the end portion of the first right crank arm 232 and the end portion of the second right crank arm 242. The right pedal arm 252 has a right pedal coupling portion 2521 bent toward the front. The right pedal 262 is rotatably coupled to the right pedal coupling portion 2521.

As in this embodiment, the driving sprocket 202 may be coupled to the first crankshaft 221. In addition, the driving sprocket 202 may also be coupled to the second crankshaft 222.

If the bicycle driving device 20 of this embodiment operates, the end portion of the first left crank arm 231 shown in FIG. 7 draws an orbit (depicted with a dotted line. Moreover, according to the location of the end portion of the first left crank arm 231, the location of the left pedal 261 is also changed as shown in FIGS. 7(a) to 7(d).

In FIG. 7(a), the first left crank arm 231 is located on the same line as a direction in which the pedal is stepped. The end portion of the first left crank arm 231 is located at an upper top. If the left pedal 261 is directly coupled to the end portion of the first left crank arm 231 shown in FIG. 7(a) and the left pedal 261 is pressed at this location, the force of rotating the first crankshaft 221 becomes 0 (zero). In FIG. 7(a), the force of stepping the pedal is transmitted as a force of pressing the first crankshaft 221. This causes the same phenomenon as in the case where the left pedal 14a is located at a location like A1 of FIG. 3.

However, even though the first left crank arm 231 is located on the same line as a direction in which the pedal is stepped in FIG. 7(a), the left pedal 261 is located at the front. If a force F is transmitted to the left pedal 261, a virtual line L connected to the first crank arm 221 is not on the same line as a direction in which the pedal is stepped. Therefore, a part of the force {a force corresponding to F*sin θ is transmitted to the first crankshaft 221, where F is a force pressing the left pedal in a gravity direction, and θ is an angle formed by L (a line connecting the pedal shaft and the first crankshaft) in a counterclockwise direction with respect to a virtual line passing through the first crank arm 221 in a gravity direction} is used for rotating the first crankshaft 221.

Figure 3:
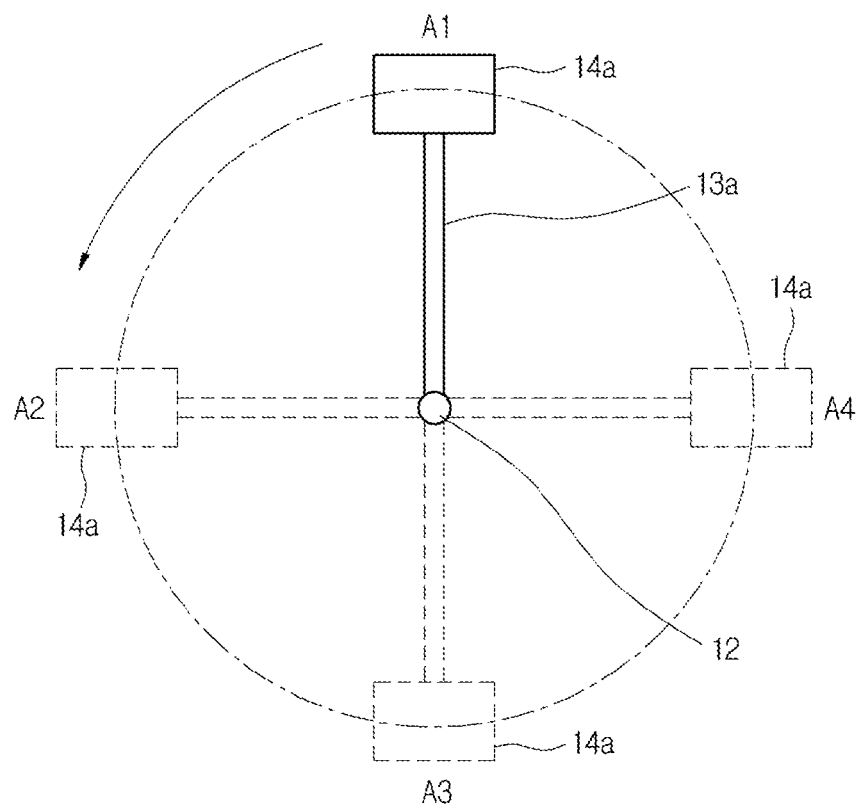
FIG. 3 is a diagram for illustrating an orbit of a left pedal of the existing bicycle driving device.

As shown in FIG. 7(a), even though the first left crank arm 231 is located on the same line as a direction in which the pedal is stepped, if the left pedal 261 is stepped, a part of the stepping force (F*sin θ) is used for rotating the first crankshaft 221. Meanwhile, if the left pedal 14a is stepped in a state where the crankshaft 12 is located on the same line as a direction in which the pedal is stepped, like at a location A1 of FIG. 3, θ=0, and thus F*sin θ=0. In other words, even though a force is applied to the left pedal 14a at A1 of FIG. 3, the force transmitted for rotating the crankshaft 12 is 0. Here, it should be noted that the location A1 of FIG. 3 is also an upper top of the left pedal 13a, and FIG. 7(a) also shows an upper top of the left pedal 261.

In the bicycle driving device 100 of this embodiment, even though a force is applied in a direction perpendicular to the pedals 261, 262 at the upper top, the force is partially used for rotating the first crankshaft 221. In other words, even though the pedals 261, 262 are located at the upper top, the force is partially used for rotating the first crankshaft 221. Meanwhile, in an existing technique, even though the left pedal 13a is pressed strongly at the location A1 of FIG. 3, the crankshaft 12 is just pressed, and the force is not used for rotating the crankshaft 12.

For better understanding, this will be described once more with reference to FIG. 7(b). In FIG. 7(a), the first left crank arm 231 rotates as much as α in a counterclockwise direction.

It is assumed that the left pedal 261 is directly coupled to an end of the first left crank arm 231, as in the existing technique. At this time, if the left pedal 261 is pressed with a vertical force F, a force as much as F*sin α is transmitted for rotating the first crankshaft 221. However, in the structure of this embodiment, since the left pedal 261 protrudes forwards, the virtual line L connecting the left pedal 261 and the first crankshaft 221 is rotated as much as β. Therefore, the force of F*sin β is used for rotating the first crankshaft 221. Because β>α, it is more effect that the left pedal 261 is located at the front as shown in FIG. 7(b), in comparison to the case where the left pedal 261 is directly coupled to an end of the first left crank arm 231. In other words, in the bicycle driving device 20 of this embodiment, the force of pressing the left pedal 261 is more used for rotating the first crankshaft 221 in comparison to the existing technique.

FIG. 8 shows an orbit O1 along which the end portion of the first left crank arm 231 moves and an orbit O2 along which the left pedal 261 moves. It may be found that, based on the first crankshaft 221, in a region located at the front (a left region in the figure), the orbit O2 of the left pedal 261 is farther than the orbit O1 of the end portion of the first left crank arm 231. Therefore, this means that in a region where a force should be applied to the left pedal 261 (a region where the left pedal is located at the front), a force may be applied to the left pedal 261 more easily (due to the principle of levers). Moreover, in an effective region where the left pedal 261 is located at the front of the first crankshaft 221, if the left pedal 261 is pressed, the energy loss is reduced, and thus a rotating force may be more effectively transmitted to the first crankshaft 221 in comparison to the existing technique, as described above.

FIG. 9 is a plane view showing the left pedal arm 251 of the bicycle driving device 20 according to the present disclosure. The left pedal arm 251 is bent into an "L" shape. The left pedal arm 251 may also be bent with another shape. A bent and protruding portion of the left pedal arm 251 is the left pedal coupling portion 2511. As shown in FIG. 4, in the bicycle driving device 20, the left pedal coupling portion 2511 is located at the front.

A left pedal arm guide hole 2512 is formed in the left pedal arm 251, and the left pedal arm guide hole 2512 is coupled to the second left crank arm 241. Therefore, in the left pedal arm guide hole 2512, the second left crank arm 241 is floatable. Here, the term "floatable" means that the arms are guide-coupled to each other to make a movement within a limited range.

The bicycle frame 201 may be modified in various shapes depending on its use. At this time, if the second left crank arm 241 has a length equal to or smaller than the first left crank arm 231, when these arms rotate by the same angle, the left pedal arm 251 coupled to the end may change its length. In order to compensate such a mechanical error, the second left crank arm 241 serving as a driven shaft may be designed to float in the left pedal arm guide hole 2512. A right pedal arm guide hole (not shown) having the same shape as the left pedal arm guide hole 2512 may also be formed in the right pedal arm 252.

Meanwhile, the left pedal arm 251 and the second left crank arm 241 may adopt any know guide structure as long as they are floatable within a predetermined range.

The left pedal arm 251 and the right pedal arm 252 may have a bent form as in this embodiment, or may also have a linear form. If the second crankshaft 222 is located at an upper portion on the basis of the first crankshaft 221, the left pedal arm 251 and the right pedal arm 252 have a bent form. Meanwhile, if the second crankshaft 222 is provided horizontally on the basis of the first crankshaft 221, the left pedal arm 251 and the right pedal arm 252 may have a linear form.

In other words, if the above bicycle driving device 20 is used, the crankshaft 221 may be efficiently rotated with a smaller force in comparison to the existing technique. Moreover, by reducing an energy loss, the force of a rider is effectively transmitted for rotating the crankshaft 221.

Figure 10:
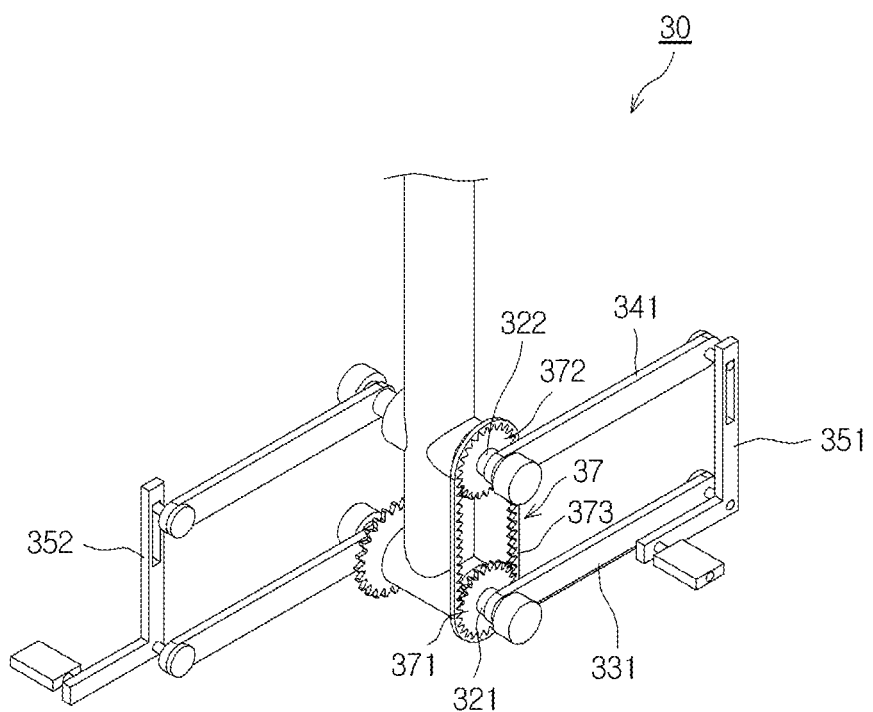
FIG. 10 is a perspective view showing a bicycle driving device according to the second embodiment of the present disclosure.

FIG. 10 is a perspective view showing a bicycle driving device 30 according to the second embodiment of the present disclosure. The configuration of this embodiment is substantially identical to that of the bicycle driving device 20 of the first embodiment. Therefore, just different features will be described.

In the bicycle driving device 30 of this embodiment, a power transmission module 37 is coupled to the first crankshaft 321 and the second crankshaft 322. This allows the first crankshaft 321 and the second crankshaft 322 to simultaneously rotate at the same speed. Moreover, this reduces a load applied to the coupled portions of the first left crank arm 331, the left pedal arm 351 and the second left crank arm 341.

If the power transmission module 37 is not provided, the rotating force of the first crankshaft 321 is transmitted to the second crankshaft 322 in the order of the first left crank arm 331, the left pedal arm 351 and the second left crank arm 341. At this time, since the first left crank arm 331, the left pedal arm 351 and the second left crank arm 341 are connected by means of pivotal joints, a great load is transmitted to a rotary shaft due to the force applied for power transmission. For this reason, the rotary shaft may be distorted. To solve this problem, the power transmission module 37 is coupled between the first crankshaft 321 and the second crankshaft 322 to transmit the power of the first crankshaft 321 directly to the second crankshaft 322.

The power transmission module 37 of this embodiment includes sprockets 371, 372 and a chain 373. However, the power transmission module 37 may be a combination of various configurations using pulleys, belts or the like.

Meanwhile, the left pedal arm 351 of this embodiment may have a left pedal arm guide hole 2512 formed at a portion coupled to the second left crank arm 341, as shown in FIG. 9. The right pedal arm 352 may also have a right pedal arm guide hole (not shown).

The embodiments of the present disclosure have been described in detail. However, the embodiments are just for illustrations and not intended to limit the scope of the appended claims. Many changes, modifications and equivalents can be made thereto by those having ordinary skill in the art, and such changes, modifications and equivalents also fall within the scope of the present disclosure.

INDUSTRIAL APPLICABILITY

The present disclosure is applicable to a bicycle industry.

What is claimed is:

1. A bicycle driving device, comprising:
   a first socket coupled to a frame;
   a first crankshaft rotatably coupled to the inside of the first socket;
   a first left crank arm coupled to the left side of the first crankshaft;
   a first right crank arm coupled to the tight side of the first crankshaft;
   a second socket coupled to the frame at a location spaced from the first socket;
   a second crankshaft rotatably coupled to the inside of the second socket;
   a second left crank arm coupled to the left side of the second crankshaft;
   a second right crank arm coupled to the right side of the second crankshaft;
   a left pedal arm pivotally coupled to an end portion of the first left crank arm and to an end portion of the second left crank arm, the left pedal arm having a left pedal coupling portion positioned on an end thereof to be closer to the front than the end portion of the first left crank arm;
   a left pedal rotatably coupled to the left pedal coupling portion;
   a right pedal arm pivotally coupled to an end portion of the first right crank arm and to an end portion of the second right crank arm, the right pedal arm having a right pedal coupling portion positioned on an end thereof to be closer to the front than the end portion of the first right crank arm; and
   a right pedal rotatably coupled to the right pedal coupling portion.

2. The bicycle driving device according to claim 1,
   wherein the left pedal arm and the second left crank arm are coupled to be floatable, and
   wherein the right pedal arm and the second right crank arm are coupled to be floatable.

3. The bicycle driving device according to claim 1,
   wherein a power transmission module for transmitting a power of the first crankshaft to the second crankshaft is further coupled between the first crankshaft and the second crankshaft.

4. The bicycle driving device according to claim 1,
   wherein the second crankshaft is located at an upper portion of the first crankshaft.

5. The bicycle driving device according to claim 1,
   wherein a driving sprocket is coupled to at least one of the first crankshaft and the second crankshaft.

* * * * *